Feb. 6, 1968  J. E. PIERSON  3,367,847
PURIFICATION OF ETHYLENE GLYCOL CONTAINING SALTS OF
TEREPHTHALIC ACID BY PLURAL DISTILLATION
Filed Feb. 1, 1966
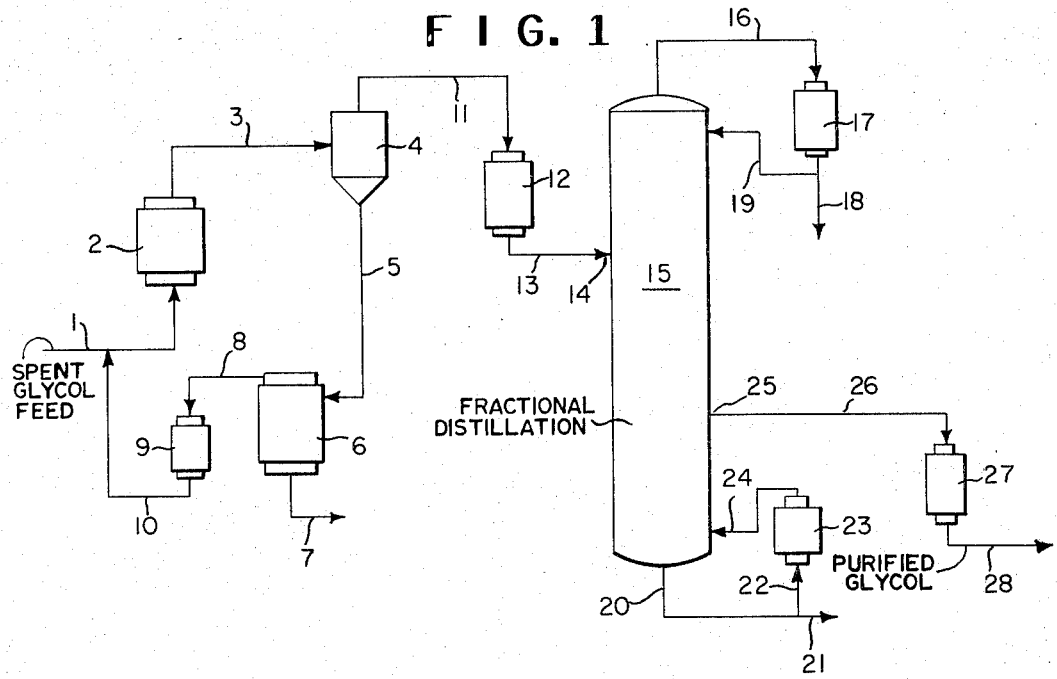
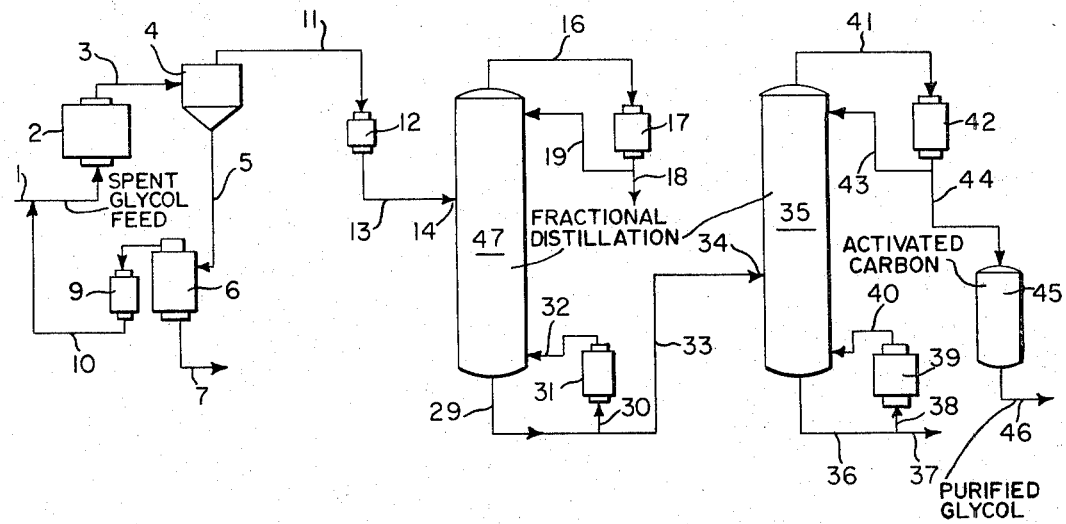
INVENTOR
JOHN EDWARD PIERSON
BY *Lynn N. Disher*
ATTORNEY

United States Patent Office 3,367,847
Patented Feb. 6, 1968

3,367,847
PURIFICATION OF ETHYLENE GLYCOL CONTAINING SALTS OF TEREPHTHALIC ACID BY PLURAL DISTILLATION
John E. Pierson, Charleston, W. Va., assignor to E. I. du Pont de Nemours and Company, Wilmington, Del., a corporation of Delaware
Filed Feb. 1, 1966, Ser. No. 530,763
8 Claims. (Cl. 203—41)

ABSTRACT OF THE DISCLOSURE

Ethylene glycol recovered from a process for making polyethylene terephthalate from ethylene glycol and terephthalic acid or its derivatives can be purified to such a degree that it can be used interchangeably with virgin ethylene glycol in polyester manufacture by first removing the solids, principally sodium salts of terephthalic acid, from the spent glycol, then subjecting the solids-free glycol to fractional distillation to remove high- and low-boiling impurities and finally treating the distilled glycol with activated carbon to remove trace amounts of impurities which adversely affect the ultra-violet light transmission of the glycol.

---

This invention relates to a process for purifying ethylene glycol. More particularly, this invention is directed to a process for purifying "spent" ethylene glycol by initially removing solid impurities, then removing high and low boiling impurities by fractional distillation, and as an optional, but preferred last step, passing the ethylene glycol through activated carbon.

"Spent" ethylene glycol as used herein is intended to mean the ethylene glycol recovered from a process for making films and fibers of linear polyesters, particularly the high molecular weight linear polyesters made from ethylene glycol and terephthalic acid or its derivatives.

In the usual method of making polyethylene terephthalate, an excess of ethylene glycol is reacted with either dimethyl terephthalate or terephthalic acid under heat and pressure to produce a monomer, i.e. bis(2-hydroxyethyl)terephthalate. This monomer is polymerized under heat and reduced pressure to produce the polyester.

In this method large amounts of unreacted ethylene glycol are present in the reaction mixtures. Part of the ethylene glycol is the excess from the esterification reaction, and it is recovered by suitable recovery systems. The remainder of the ethylene glycol is that condensed out of the polymer in the polymerization step, and it is also recovered.

This recovered or "spent" ethylene glycol is normally only 95% to 98% pure glycol, by weight, and generally it must be purified before it can be reused. This is particularly true if the glycol is to be reused in a polyester making operation wherein it is desirable to use only ethylene glycol of the highest purity.

The "spent" ethylene glycol, although its composition will vary depending upon the conditions of the polyester making process, is generally an orange colored liquid of the following composition:

Ethylene glycol _____ percent by weight__ 88 to 97
Sodium salts of terephthalic acid (essentially
  sodium terephthalate) __percent by weight__ 1.5 to 6.5
Diethylene glycol _____do____ 0.1 to 4.5
Methanol _____do____ 0.1 to 3.0
Acetaldehyde _____p.p.m__ 600 to 1,000
Water _____percent by weight__ 0.5 to 3.5 and trace amounts of other impurities, many not identified.

Thus it becomes highly desirable to develop an economic process of purifying "spent" ethylene glycol until it is essentially pure ethylene glycol and can be reused, for example, as a major component of an anti-freeze composition or as an initial reactant in a polyester manufacturing process. It is particularly desirable to purify such "spent" glycol such that it can be used interchangeably with virgin glycol in the production of polyester.

According to the invention a process is provided for purifying "spent" ethylene glycol which comprises the steps of:
  (a) Feeding a stream of "spent" ethylene glycol into means that concentrates, separates and removes the solids content of said "spent" ethylene glycol.
  (b) Withdrawing a stream of the remaining content of said "spent" ethylene glycol from said means and introducing it into the upper section of a distillation zone maintained under vacuum.
  (c) Subjecting said remaining content to fractional distillation in said distillation zone,
  (d) Withdrawing top and bottom streams from different levels of said zone and an ethylene glycol product stream as a vapor from an intermediate level.

In the preferred embodiment of the process there is an additional step which involves contacting the product stream of ethylene glycol with activated carbon. This additional step removes trace amounts of impurities remaining in the ethylene glycol which affect its ultra-violet light transmission and would adversely affect the color of polyester produced from this glycol. The additional step is not necessary when the product ethylene glycol is to be reused in compositions and processes wherein these trace amounts of impurities do not create quality problems.

In the drawings,
FIGURE 1 is a schematic diagram of the process of the invention,
FIGURE 2 is a schematic diagram of a preferred embodiment of the invention wherein the "spent" ethylene glycol is purified to a very high degree, i.e. such that it can be intermixed with virgin glycol and reused in a polyester manufacturing process.

With reference to FIG. 1 a stream of "spent" ethylene glycol is charged through pipe 1 to a primary evaporator 2. The "spent" glycol has a composition of approximately 96.5% ethylene glycol, 1.5% water, 2% solids, primarily the sodium salts of terephthalic acid, and trace amounts of acetaldehyde, methanol, diethylene glycol and other impurities. At a concentration on the order of 2%, the sodium salts are normally in solution, however, when concentrated to 5 to 20%, they will precipitate to solid form.

The primary evaporator is heated by steam from an external source and is operated under vacuum conditions. Throughout the process of the invention the separation and distillation steps are conducted under vacuum so that the process can be operated at temperatures below 175° C. At temperatures higher than 175° C., decomposition of the product ethylene glycol becomes a problem.

Within the evaporator 2 a portion of the "spent" glycol is vaporized and the remainder is composed of a slurry of ethylene glycol and the solid impurities. The solids are concentrated to about 20%, by weight, in the slurry. The vapor and slurry are transported through pipe 3 to separator 4. The separator 4 also operates under vacuum conditions. In the separator the slurry is separated from the vapor.

The slurry is drawn off through pipe 5 to a secondary evaporator 6. In this secondary evaporator substantially all of the ethylene glycol present in the slurry is vaporized and separated from the solid impurities. The vaporized ethylene glycol is taken off as overhead through pipe 8 and fed into condenser 9 where it is condensed and recycled to the primary evaporator 2 through pipe 10.

The 10% ethylene glycol not recovered and the solid impurities are then purged from the secondary evaporator 6 through pipe 7. This purge can be burned in an incinerator, if desired.

In the process of the invention, it is particularly important that the solid impurities be removed first. If they are not, at the temperatures and presures encountered in the subsequent distillation step, the solid could decompose and create additional purification problems or appear in the final product.

The means that separates the ethylene glycol can be any unit that efficiently separates the solid impurities (sodium salts) from the glycol in the slurry without introducing additional impurities, thus any of several types of evaporators such as scraped film or thin film can be used, also drum driers; fluidized beds; centrifuges, filters and the like.

An example of a means which can be used is a vacuum drum drier. In this embodiment (not illustrated) the 20% slurry from the separator 4 would be fed to the drum drier where most of the ethylene glycol present would be vaporized and separated from the solid impurities. The vaporized ethylene glycol would be taken off overhead, condensed and recycled to the primary evaporator. The unrecovered ethylene glycol and solid impurities would then be purged from the bottom of the drum drier.

The remaining content of the "spent" ethylene glycol, i.e. the vaporized portion, separated from the slurry, is drawn off of the separator 4 as overhead through pipe 11. The vapor is condensed in condenser 12 and fed through pipe 13 into the upper section of the distillation column 15. This feed is preferably in the liquid state, however, it can be fed into the column as a vapor.

The feed inlet 14 should be in the upper section of the distillation column. For example, if distillation column 15 was composed of forty plates, the feed would be introduced, preferably, at about the 25th plate. As will be explained subsequently, the feed is located in the upper section since the product is taken from the column as a vapor side stream.

The distillation column 15 is operated under vacuum conditions, e.g. 200 mm. Hg absolute pressure. Within the column a portion of ethylene glycol and the low boilers present in the "spent" ethylene glycol, the low boilers being essentially water, methanol and acetaldehyde, are vaporized and rise to the top. The vapor is drawn off as overhead through pipe 16 and fed into condenser 17. After being condensed, part of the overhead is recirculated into the column through pipe 19 as reflux while the remaining portion is purged from the system at 18. This purge is essentially water, e.g. 85%, and is disposed of in a suitable manner.

The reflux ratio at 19 can be varied depending upon the location of the feed inlet, column conditions, and the degree of purity desired for the product ethylene glycol. For ethylene glycol of 99.9% purity, by weight, a reflux ratio of 15:1 is sufficient, however, the higher the ratio the purer the product, and a ratio of about 25:1 is preferred.

In the lower section of column 15, the high boilers, i.e. essentially diethylene glycol and other higher glycols, flow to the bottom of the column where a mixture of them and ethylene glycol are removed through pipe 20. Part of the bottom stage liquid can be purged through pipe 21, for example, a purge on the order of 1%, while the remainder is fed through pipe 22 into reboiler or calandria 23 where it is partially vaporized and fed into the bottom of the column through pipe 24. The purge 21 from the distillation column can be burned in an incinerator.

The calandria 23 can be heated from a suitable external source and its temperature and flow is adjusted such that it maintains a column bottoms temperature on the order of 145° to 175° C. and a top temperature of 80° to 110° C.

The ethylene glycol product is removed as a vapor side stream at a point 25 below the feed point and the vertical center of the column, for example, at the 10th plate of a 40 plate column. It is preferred that the product outlet be about ⅓ of the column below the feed; this spacing permits the high boilers to be removed from the product. The feed point and outlet, reflux ratio and column size are all adjusted to maintain a high quality product. It is desirable to have the $L/V$ ratio below the feed point at 1.6:1 to 1.5:1, preferably 1.56:1. In this ratio L is the flow rate of the liquid from a rectifying stage in moles/hour and V is the flow rate of the vapor from a rectifying stage in moles/hour.

After removing the ethylene glycol product side stream through pipe 26, it is condensed in condenser 27 and fed through pipe 28 to storage.

As previously explained, to obtain an ethylene glycol product of very high purity, such that it is useful for polyester manufacture, the process of the invention can be modified.

A preferred embodiment employing these modifications is illustrated in FIG. 2. Basically in this embodiment, instead of fractionally distilling by removing the high and low boilers, and product side stream in one column, the low boilers are removed in a first column. The ethylene glycol and high boilers are taken off as bottoms and fed into a second column. In this column the high boilers are removed as bottoms and the ethylene glycol product is removed as overhead. The ethylene glycol product is passed through a column of activated carbon to remove trace amounts of other impurities. As will be explained subsequently, this last step is one of the most important aspects of this embodiment.

This embodiment of the process of the invention will now be explained in more detail with reference to FIG. 2.

The initial step in the process involving removing the solid impurities from the "spent" ethylene glycol is the same as previously set forth and will not be described further. The "spent" ethylene glycol, less the solids, is fed into the upper section of a vacuum operated distillation column 47, an intermediate column. In this first distillation column, the low boiling impurities are removed as overhead as previously set forth. To obtain the high purity desired for polyester grade ethylene glycol the reflux ratio of the flow at 19 should be about 25:1. The bottoms of this column, which includes the high boilers and ethylene glycol will be taken off by pipe 29. A portion of the bottoms will be drawn off through pipe 30 into the calandria 31, wherein it will be partially vaporized and fed back into the bottom of the column through pipe 32. The column has a top temperature of 95° to 100° C., maintained by regulating the make rate. The bottom temperature is normally 165° to 170° C.

The remaining portion of the bottoms will be transferred through pipes 33 and fed into a second distillation column 35, i.e. the refiner column. The feed will enter at a point 34 in the lower half of the column, for example at the 11th plate of a 40 plate column. This refiner column, which also operates under vacuum conditions, separates the high boilers from the ethylene glycol.

The high boilers are collected in the bottom of this column and drawn off through pipe 36. A portion of the bottoms, about 1%, are purged through pipe 37 and can be transported to an incinerator and burned. The remaining portions are fed through pipe 38 into calandria 39 and recirculated into the column through pipe 40. The top temperature will be approximately 160° C. and the bottom temperature will be about 165° to 170° C. The temperature at the top of the column will be governed by the operating pressure. At the exemplary pressure of 200 mm. Hg, the ethylene glycol will boil at approximately 160° C.

The overhead of this column is taken off through pipe 41. This overhead is essentially ethylene glycol, containing only trace amounts of impurities. The overhead is fed into condenser 42. A portion of the outflow of condenser 42 is fed as reflux into the column through pipe 43. The reflux ratio can be very low and can be in the range of 0.25:1 to 0.75:1, preferably 0.5:1. The remaining portion of the condenser output goes through pipe 44 into a column 45 containing activated carbon.

Column 45 is essentially a bed of granular or powdered activated carbon, preferably activated carbon granules. The liquid ethylene glycol product flows through this bed and trace quantities of impurities not removed by the distillation process are removed. The figure shows only one column 45, it may be desirable to have several columns in series. The output of the activated carbon column flows through pipe 46 into storage.

The activated carbon granules are a form of carbon characterized by its high adsorptive capacity for gases, liquids and colloidal solids. This granule is made by the destructive distillation of wood or coal and then activating the carbon residue to develop adsorptive power. The activation is usually accomplished by heating the carbon to a high temperature, 800° C. to 900° C. with steam to obtain a porous particle structure.

The activated carbon can be contained in fixed beds or columns, e.g. a series of columns, or if desired in a single pulse type column wherein there is a slight flow of carbon through the column counter current to the ethylene glycol. This pulse type unit has the advantage in that the carbon being used to purify the ethylene glycol is being continuously replenished.

The carbon treatment should be performed after the solids and the high and low boilers have been removed from the ethylene glycol. Liquid ethylene glycol at 15°–35° C. is brought into contact with the activated carbon. The carbon removes the trace amounts of impurities present in the product. These impurities are esters, aldehydes and other compounds, not positively identified that effect ultra-violet light transmittance of the ethylene glycol. This ultra-violet light transmittance is an important quality of ethylene glycol since it is a measure of trace quantities of impurities present in the glycol which could effect the quality of any polyester produced from the glycol.

The activated carbon treatment can be used to upgrade commercially available or off grade ethylene glycol, but it is particularly adapted for use in the recovery of pure ethylene glycol from "spent" ethylene glycol.

The distillation zone of the process can be either a single vacuum column or two vacuum columns in series. A single distillation column with a product side stream performs approximately the same function as does two ordinary columns operating in series. In the preferred embodiment, two distillation columns are used, however, this is not critical and a single column having sufficient stages can be used.

The fractional distillation involved in the process of the invention occurs in columns through which the vapors and liquids pass counter currently over various intervals which promote mass transfer. The particular interval used is not critical and many types of cross flow trays may be used, e.g. bubble cap, sieve, valve, etc. Packing can be used, however, this is not preferred in view of possible channeling problems. The number of intervals or plates used is not critical; the more plates used, the better the results. A column with 40 plates is particularly useful, however, this number is not to be considered limiting since an ethylene glycol product of high purity can be obtained with fewer plates.

The distillation zone is maintained under vacuum conditions due to the heat-sensitive nature of ethylene glycol. The use of the vacuum permits lower column temperatures and avoids decomposition of the ethylene glycol.

The following examples are submitted so that the invention can be more easily understood.

Example 1

This example illustrates an embodiment of the process of the invention as illustrated by the flow sheet of FIGURE 1.

The initial feed 1 is 19,430 pounds per hour (p.p.h.) of "spent" ethylene glycol containing 18,175 p.p.h. ethylene glycol, 290 p.p.h. water, 870 p.p.h. solids, 19 p.p.h. acetaldehyde, 19 p.p.h. methanol and 57 p.p.h. diethylene glycol. This feed is combined with a stream 10 of ethylene glycol recycled from the secondary evaporator 6. The recycle stream has a flow rate of 3,322 p.p.h. and is composed of ethylene glycol 3,241 p.p.h., diethylene glycol 11 p.p.h. and water 80 p.p.h. The combined streams flow into evaporator 2 which is operated at a vacuum pressure of 200 mm. Hg and a temperature of 160° C.

The output of the primary evaporator is fed into the separator 4 as a vaporized portion and a slurry of ethylene glycol and solids (20% solids). The separator is operated at a pressure of 200 mm. Hg and a temperature of 160° C. The slurry is separated from the vapor content in the separator and removed at a rate of 4,350 p.p.h.

The slurry is fed into the secondary evaporator 6 which is maintained at a temperature of 125° C. to 130° C. and a pressure of 50 mm. Hg. The secondary has two outputs, one a purge 7 and the other 8, recovered ethylene glycol. The purge is removed from the bottom of the evaporator and is sent to disposal; this purge is 10% glycol (180 p.p.h.) and 90% solids (870 p.p.h.). The overhead 9, as previously set forth, is essentially ethylene glycol and after being condensed in condenser 9 is recycled into the feed stream through pipe 10 at the rate of 3,332 p.p.h.

The overhead 11 from the separator 4 is fed into the condenser at the rate of 18,379 p.p.h. This overhead is composed of 17,986 p.p.h. ethylene glycol, 17 p.p.h. diethylene glycol, 370 p.p.h. water, 3 p.p.h. methanol and 3 p.p.h. acetaldehyde.

The condensed overhead is fed into the 24th plate of a 40 plate distillation column operating at 200 mm. Hg absolute pressure. The top of the column is maintained at 90 to 100° C. while the bottom is maintained at 165° to 170° C.

The overhead from the column 15 is fed through condenser 17 and a portion is refluxed back into the column at a reflux ratio of 15:1. 422 p.p.h. of the overhead is purged from the condenser through pipe 18; this purge is composed of methanol, acetaldehyde, water and ethylene glycol. This urge is mainly water, i.e. 362 p.p.h. water.

At the bottom of the column a 1% purge of 370 p.p.h. of waste containing the high boilers is maintained; this purge is 355 p.p.h. ethylene glycol and 15 p.p.h. diethylene glycol with traces of other higher glycols. The remainder of the bottoms being partially vaporized in the calandria 23 and recycled into the column.

At the 10th plate of the column, the product ethylene glycol is removed as a vapor side stream at the rate of 17,573 p.p.h. This product is 17,570 p.p.h. ethylene glycol, 1 p.p.h. water and 2 p.p.h. diethylene glycol.

The ethylene glycol product is over 99.9% pure ethylene glycol. This product is useful as a major component of an anti-freeze composition.

The ethylene glycol used in anti-freeze compositions must be sufficiently pure that its ability to lower the freezing point of water is not impaired, it will not have corrosive tendencies within the cooling system, and will not impart to the coolant any other undesirable properties that would interfere with the coolants primary function of cooling the system. The ethylene glycol purified by the process of this example meets these standards.

Example 2

This example illustrates the preferred embodiment of the process of the invention and is related to the flow sheet of FIGURE 2.

The initial feed stream 1 is 20,465 p.p.h. of "spent" ethylene glycol containing 19,304 p.p.h. ethylene glycol, 340 p.p.h. solids (sodium terephthalate), 721 p.p.h. water, 20 p.p.h. acetaldehyde, 20 p.p.h. methanol and 60 p.p.h. diethylene glycol. This stream is combined with the output of the secondary evaporator 6. This output is 1,797 p.p.h. which is composed of 1,786 p.p.h. ethylene glycol and 11 p.p.h. diethylene glycol.

The primary evaporator 2 is operated at 160° C. and 200 mm. Hg.

In the separator 4 the slurry containing the solid impurities is removed at a rate of 3,605 p.p.h. The overhead of the separator 4 is fed through the condenser 12 into the first distillation column at the rate of 18,621 p.p.h. This input is 18,265 p.p.h. ethylene glycol, 338 p.p.h. water, 3 p.p.h. acetaldehyde, 4 p.p.h. methanol and 11 p.p.h. diethylene glycol.

The feed is located at the 25th plate of the 40 plate colmn. The column is maintained at 200 mm. Hg and has a bottoms temperature of 165° C. and a top temperature of 95° C. to 100° C.

The low boilers are removed from the top and condensed and a purge of 379 p.p.h. is maintained. This purge is 325 p.p.h. water and 53 p.p.h. ethylene glycol. The remaining portion of the overhead is refluxed back into the top of the column and a reflux ratio of 25:1 is maintained.

The bottoms from the first column are drawn off and part recirculated through reboiler 31 and the remainder at a rate of 18,229 p.p.h. is fed into a second 40 plate column. The feed enters the second column at the 11th plate and is composed of 18,212 p.p.h. ethylene glycol, 6 p.p.h. water and 11 p.p.h. diethylene glycol. The second column is operated under a pressure of 200 mm. Hg and the temperature ranges from 165° C. at the bottom to 160° C. at the top. The bottoms from this column are taken off through line 36 and a purge of 364 p.p.h. is taken off. This purge is 354 p.p.h. of ethylene glycol and 10 p.p.h. diethylene glycol.

Ethylene glycol is taken off as a vapor through the top of the column and is condensed in condenser 42. A portion of the output of the condenser is refluxed back into the top of the column at a reflux rate of 0.5:1. The remaining output of the condenser is 17,864 p.p.h. and of this 17,857 p.p.h. is ethylene glycol, 6 p.p.h. water and 1 p.p.h. diethylene glycol.

The condensed output is passed through a column of activated carbon 45 and is then filtered to remove carbon fines. Trace amounts of impurities are removed in the activated carbon column. The final product is 17,757 p.p.h. and is composed of 17,750 p.p.h. ethylene glycol, 6 p.p.h. water and 1 p.p.h. diethylene glycol.

The ultra-violet light transmittance of the final product was tested. Pure ethylene glycol is nearly transparent at wave lengths of 220 m$\mu$ and longer. The final product gave the following ultra-violet transmittance at the wave lengths indicated:

M$\mu$:
    220 ---------------------------------- 94.5
    275 ---------------------------------- 100.5
    350 ---------------------------------- 100.3

The final product was also tested by high resolution gas chromatography and was found to be a very pure material. Material of this purity can be used interchangeably or intermixed with virgin glycol in the production of polyester films and fibers.

The product ethylene glycol is a useful commercial product that has many applications. Among its well-known uses are the components of anti-freeze compositions and as a starting material for creating polyester fibers and films, i.e. particularly films and fibers of polyethylene terephthalate.

What is claimed is:

1. A continuous process for purifying spent ethylene glycol containing from about 1.5% to about 6.5% by weight of sodium salts of terephthalic acid comprising the steps of:
   (a) feeding a stream of said spent ethylene glycol into a first evaporating means,
   (b) heating said spent ethylene glycol and evaporating a portion thereof to form a first vapor portion comprising ethylene glycol and a slurry containing from about 5% to about 20% by weight of solid sodium salts of terephthalic acid,
   (c) separating said first vapor portion from said slurry and feeding said slurry into a second evaporating means,
   (d) evaporating from said slurry a second vapor portion comprising ethylene glycol and recycling said second vapor portion as a condensate into said first evaporating means, and
   (e) feeding said first vapor portion into the upper section of a fractional distillation zone operating under a vacuum, removing a stream of low-boiling impurities from the top of said zone, removing a stream of high-boiling impurities from the bottom of said zone and removing a vaporized ethylene glycol product stream from an intermediate level of said zone below the point at which said first vapor portion is fed into said zone.

2. The process of claim 1 wherein said product stream is condensed and then contacted with activated carbon, thereby producing purified ethylene glycol which can be used interchangeably with virgin ethylene glycol in polyester manufacture.

3. The process of claim 1 wherein the slurry formed in step (b) contains about 20% by weight of solid sodium salts of terephthalic acid.

4. The process of claim 3 wherein said product stream is condensed and then contacted with activated carbon, thereby producing purified ethylene glycol which can be used interchangeably with virgin ethylene glycol in polyester manufacture.

5. A continuous process for purifying spent ethylene glycol containing from about 1.5% to about 6.5% by weight of sodium salts of terephthalic acid comprising the steps of:
   (a) feeding a stream of said spent ethylene glycol into a first evaporating means,
   (b) heating said spent ethylene glycol and evaporating a portion thereof to form a first vapor portion comprising ethylene glycol and a slurry containing from about 5% to about 20% by weight of solid sodium salts of terephthalic acid,
   (c) separating said first vapor portion from said slurry and feeding said slurry into a second evaporating means,
   (d) evaporating from said slurry a second vapor portion comprising ethylene glycol and recycling said second vapor portion as a condensate into said first evaporating means,
   (e) feeding said first vapor portion into the upper section of a first fractional distillation zone operating under a vacuum, removing low-boiling impurities from the top of said first zone and removing ethylene glycol and high-boiling impurities from the bottom of said first zone, and
   (f) feeding the bottoms from said first zone into the lower section of a second fractional distillation zone operating under a vacuum, removing high-boiling impurities from the bottom of said second zone and removing a vaporized ethylene glycol product stream from the top of said second zone.

6. The process of claim 5 wherein said product stream is condensed and then contacted with activated carbon, thereby producing purified ethylene glycol which can be used interchangeably with virgin glycol in polyester manufacture.

7. The process of claim 5 wherein the slurry formed in step (b) contains about 20% by weight of solid sodium salts of terephthalic acid.

8. The process of claim 7 wherein said product stream is condensed and then contacted with activated carbon, thereby producing purified ethylene glycol which can be used interchangeably with virgin ethylene glycol in polyester manufacture.

References Cited

UNITED STATES PATENTS

| 143,654 | 10/1873 | Andersen | 203—41 |
| 1,889,617 | 11/1932 | Truog | 203—41 X |
| 2,327,779 | 8/1943 | Fisher et al. | 203—41 |
| 2,768,942 | 10/1956 | Marple et al. | 203—41 |
| 2,779,770 | 1/1957 | Cass | 260—347.9 |

FOREIGN PATENTS

| 883,040 | 11/1961 | Great Britain. |
| 779,063 | 7/1957 | Great Britain. |
| 927,809 | 6/1963 | Great Britain. |

OTHER REFERENCES

Publication by Pittsburgh Chemical Co. on Activated Carbon, November 1961.

NORMAN YUDKOFF, *Primary Examiner.*

F. E. DRUMMOND, *Assistant Examiner.*